(12) United States Patent
Yu et al.

(10) Patent No.: US 8,303,159 B2
(45) Date of Patent: Nov. 6, 2012

(54) EFFICIENT WET STARCH PREPARATION SYSTEM FOR GYPSUM BOARD PRODUCTION

(75) Inventors: Qiang Yu, Grayslake, IL (US); Ron Schenck, Valparaiso, IN (US); Salvatore Digennaro, Valparaiso, IN (US); Stephen Folson, Merrillville, IN (US); Kevin Henry, Hobart, IN (US); Tim Guined, Hobart, IN (US)

(73) Assignee: United States Gypsum Company, Chicago, IL (US)

( * ) Notice: Subject to any disclaimer, the term of this patent is extended or adjusted under 35 U.S.C. 154(b) by 1097 days.

(21) Appl. No.: 12/205,615

(22) Filed: Sep. 5, 2008

(65) Prior Publication Data

US 2010/0061180 A1 Mar. 11, 2010

(51) Int. Cl.
*B28C 5/00* (2006.01)
(52) U.S. Cl. .................................. 366/3; 366/2
(58) Field of Classification Search .................... 366/2, 3
See application file for complete search history.

(56) References Cited

U.S. PATENT DOCUMENTS

| | | |
|---|---|---|
| 587,944 A | 8/1897 | Eickemeyer |
| 1,230,297 A | 6/1917 | Hite |
| 1,500,452 A | 7/1924 | Haggerty |
| 1,702,729 A | 2/1929 | Hite |
| 1,868,671 A | 7/1932 | Nelson |
| 1,937,472 A | 11/1933 | Ericson |
| 2,207,339 A | 7/1940 | Camp |
| 2,871,146 A | 1/1959 | Etheridge |
| 3,343,818 A * | 9/1967 | Plemous et al. .................... 366/3 |
| 3,359,146 A | 12/1967 | Lane et al. |
| 3,423,238 A | 1/1969 | Weiland |
| 3,459,571 A | 8/1969 | Shannon |

(Continued)

FOREIGN PATENT DOCUMENTS

CL 1895-1998 3/1999

(Continued)

OTHER PUBLICATIONS

Camp, T.F., "The Manufacture of Gypsum Board", Chapter III, Section II, The Manufacture and Technology of Gypsum Products, Dec. 22, 1950.

(Continued)

*Primary Examiner* — Yogendra Gupta
*Assistant Examiner* — Emmanuel S Luk
(74) *Attorney, Agent, or Firm* — Leydig Voit & Mayer, Ltd.; Philip T. Petti; David F. Janci

(57) ABSTRACT

The present invention provides a wet starch preparation system for gypsum wallboard comprising a loss-in-weight starch feeder, a venturi mixer, a vacuum pick-up unit for supplying the dry starch from the feeder at an adjustable rate to the venturi mixer, a first water pump for supplying water at an adjustable rate to the venturi mixer to form a starch pre-dispersion of from about 2% to about 10% by weight starch and a second water pump for supplying gauging water to the starch pre-dispersion, the system equipped with appropriate system controls. The present system provides more efficient use of starch such that the amount of pregelatinized starch is at least about 10% less than a system in which the starch is not pre-dispersed in water prior to the board mixer. The system can be used to make gypsum-containing products including gypsum wallboard having increased board strength and reduced board weight.

6 Claims, 2 Drawing Sheets

U.S. PATENT DOCUMENTS

| | | | |
|---|---|---|---|
| 3,573,947 A | 4/1971 | Kinkade et al. | |
| 3,666,581 A | 5/1972 | Lane | |
| 3,989,534 A | 11/1976 | Plunguian et al. | |
| 4,019,920 A | 4/1977 | Burkard et al. | |
| 4,051,291 A | 9/1977 | Long | |
| 4,057,443 A * | 11/1977 | Stiling et al. | 156/43 |
| 4,257,710 A * | 3/1981 | Delcoigne et al. | 366/8 |
| 4,265,964 A | 5/1981 | Burkhart | |
| 4,392,896 A * | 7/1983 | Sakakibara | 156/39 |
| 4,436,429 A * | 3/1984 | Strong et al. | 366/2 |
| 4,455,271 A * | 6/1984 | Johnson | 264/42 |
| 4,533,528 A | 8/1985 | Zaskalicky | |
| 4,624,574 A | 11/1986 | Mills et al. | |
| 4,632,848 A | 12/1986 | Gosset et al. | |
| 4,660,985 A | 4/1987 | Mills et al. | |
| 5,013,157 A | 5/1991 | Mills et al. | |
| 5,085,929 A | 2/1992 | Bruce et al. | |
| 5,116,671 A | 5/1992 | Bruce et al. | |
| 5,207,830 A | 5/1993 | Cowan et al. | |
| 5,484,200 A | 1/1996 | Bradshaw | |
| 5,558,710 A | 9/1996 | Baig | |
| 5,573,333 A | 11/1996 | Dahlman | |
| 5,575,844 A | 11/1996 | Bradshaw | |
| 5,660,465 A | 8/1997 | Mason | |
| 5,879,446 A | 3/1999 | Patel et al. | |
| 5,922,447 A | 7/1999 | Baig | |
| 6,059,444 A | 5/2000 | Johnson et al. | |
| 6,214,102 B1 | 4/2001 | Vandermeer | |
| 6,221,521 B1 | 4/2001 | Lynn et al. | |
| 6,342,284 B1 | 1/2002 | Yu et al. | |
| 6,387,172 B1 | 5/2002 | Yu et al. | |
| 6,409,825 B1 | 6/2002 | Yu et al. | |
| 6,475,313 B1 | 11/2002 | Peterson et al. | |
| 6,596,334 B1 | 7/2003 | Flickinger et al. | |
| 6,632,550 B1 | 10/2003 | Yu et al. | |
| 6,656,984 B1 | 12/2003 | Haasmaa et al. | |
| 6,663,707 B2 | 12/2003 | Wantling et al. | |
| 6,753,377 B1 | 6/2004 | Niinikoski et al. | |
| 6,783,587 B2 | 8/2004 | Sethuraman et al. | |
| 6,800,131 B2 | 10/2004 | Yu et al. | |
| 6,815,049 B2 | 11/2004 | Veeramasuneni et al. | |
| 6,893,752 B2 | 5/2005 | Veeramasuneni et al. | |
| 7,105,587 B2 | 9/2006 | Tagge et al. | |
| RE39,339 E | 10/2006 | Andersen et al. | |
| 7,160,420 B2 | 1/2007 | Helbling et al. | |
| 7,244,304 B2 | 7/2007 | Yu et al. | |
| 7,285,586 B2 | 10/2007 | Helbling et al. | |
| 7,347,895 B2 | 3/2008 | Dubey | |
| 7,364,015 B2 | 4/2008 | Englert et al. | |
| 7,381,261 B1 | 6/2008 | Nelson | |
| 7,422,638 B2 | 9/2008 | Trksak et al. | |
| 7,513,963 B2 * | 4/2009 | Frank et al. | 156/39 |
| 7,524,386 B2 * | 4/2009 | George et al. | 156/39 |
| 2002/0108532 A1 | 8/2002 | Kesselring et al. | |
| 2003/0084980 A1 | 5/2003 | Seufert et al. | |
| 2004/0026002 A1 * | 2/2004 | Weldon et al. | 156/43 |
| 2004/0045481 A1 | 3/2004 | Sethuraman et al. | |
| 2004/0209071 A1 | 10/2004 | Carbo et al. | |
| 2005/0019618 A1 | 1/2005 | Yu et al. | |
| 2005/0048190 A1 | 3/2005 | Trksak et al. | |
| 2005/0061203 A1 | 3/2005 | Helbling et al. | |
| 2005/0067082 A1 | 3/2005 | Mowry | |
| 2005/0084516 A1 | 4/2005 | Ballard et al. | |
| 2005/0191465 A1 | 9/2005 | Mayers et al. | |
| 2005/0219938 A1 | 10/2005 | Rigaudon et al. | |
| 2005/0223949 A1 | 10/2005 | Bailey, Jr. et al. | |
| 2005/0250858 A1 | 11/2005 | Wantling et al. | |
| 2005/0281999 A1 | 12/2005 | Hofmann et al. | |
| 2006/0278135 A1 * | 12/2006 | Liu et al. | 106/772 |
| 2007/0048490 A1 | 3/2007 | Yu et al. | |
| 2007/0048549 A1 | 3/2007 | Song et al. | |
| 2007/0102237 A1 | 5/2007 | Baig | |
| 2007/0221098 A1 | 9/2007 | Wolbers et al. | |
| 2007/0251628 A1 | 11/2007 | Yu et al. | |
| 2008/0070026 A1 | 3/2008 | Yu et al. | |
| 2008/0090068 A1 | 4/2008 | Yu | |
| 2008/0310248 A1 | 12/2008 | Rigaudon et al. | |
| 2009/0010093 A1 * | 1/2009 | Sethuraman et al. | 366/3 |

FOREIGN PATENT DOCUMENTS

| | | |
|---|---|---|
| CL | 1436-2006 | 9/2006 |
| CL | 2217-2006 | 11/2006 |
| EP | 697382 A2 | 2/1996 |
| GB | 1028890 | 5/1966 |
| KR | 1020060123582 A | 12/2006 |
| RU | 2263644 A | 11/1981 |
| SU | 885178 A | 11/1981 |
| SU | 887506 | 12/1981 |
| WO | 01/34534 A2 | 5/2001 |
| WO | WO 01/81263 A1 | 11/2001 |
| WO | WO 01/81264 A1 | 11/2001 |
| WO | WO 2004/061042 A1 | 7/2004 |
| WO | WO 2004/083146 A2 | 9/2004 |
| WO | 2005/080294 A1 | 9/2005 |

OTHER PUBLICATIONS

Petertson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, May 2000, pp. 9-1-9-16.

Programmable logic controller, Retrieved on Jul. 31, 2008 from http://en.wikipedia.org/wiki/Programmable_logic_controller.

European Patent Office, Extended European Search Report in 07754981.4 (Aug. 26, 2011).

Korean Patent Office, International Search Report in PCT/US2009/055383 (Jun. 3, 2010).

US Receiving Office, International Search Report in PCT/US2007/008555 (Jul. 31, 2008).

Lin et al., "Characterization and Analysis of Porous, Brittle Solid Structures by X-Ray Micro Computed Tomography" JOM, vol. 62, No. 12, p. 86-89, Mineral, Metals and Materials Society, Dec. 2010.

Ratinov, V.B. et al. Dobavki v beton (Concrete Admixtures), in Russian, ISBN 5274005667 / 9785274005661 / 5-274-00566-7, Moscow, Stroyizdat, 1989, pp. 20, 21, 105-110.

* cited by examiner

EFFICIENT WET STARCH PREPARATION SYSTEM FOR GYPSUM BOARD PRODUCTION

FIELD OF THE INVENTION

The present invention relates to a system for pre-dispersing starch in water before adding the starch dispersion to gypsum-containing slurries in the production of gypsum-containing products. The system can be used to make gypsum-containing products including gypsum wallboard having increased board strength and reduced board weight.

BACKGROUND OF THE INVENTION

Certain properties of gypsum (calcium sulfate dihydrate) make it very popular for use in making industrial and building products, particularly gypsum wallboard. Gypsum is a plentiful and generally inexpensive raw material which, through a process of dehydration (or calcination) and rehydration, can be cast, molded or otherwise formed into useful shapes. The base material from which gypsum wallboard and other gypsum products are manufactured is the hemihydrate form of calcium sulfate ($CaSO_4 \cdot \frac{1}{2}H_2O$), commonly termed "stucco," which is produced by heat conversion of the dihydrate form of calcium sulfate ($CaSO_4 \cdot 2H_2O$), from which 1½ water molecules have been removed. After rehydration, the hemihydrate dissolves, gypsum crystals precipitate, and the crystal mass sets and becomes solid, providing a set gypsum material.

In order to make gypsum-containing products, gypsum-containing slurries are generally prepared. The gypsum-containing slurries may contain stucco and water, and other known ingredients and additives, such as, for example, starch, dispersants, accelerators, binders, glass fibers, and paper fibers, etc. Normally, dry starch is added to the dry stucco and is introduced into a board mixer on the production line along with the other dry ingredients.

Starch is known to be a good binder for gypsum crystals within a set gypsum core, and can increase board strength. In addition, starch can function to provide an improved interface bonding between the set gypsum core and a cover sheet in a wallboard product.

Use of a fine ground pregelatinized corn starch (for example, where >99% of particles pass through a 100 mesh screen), in gypsum-containing slurries is known in the art. However, the fine ground starch requires extra energy and costs more to produce and it also produces a fine dust that is difficult to handle during its production and application. Another problem is that the fine starch can require additional process water when mixing with stucco and water to make a desired gypsum containing slurry. For example, one pound of dry fine ground starch can increase water demand in gypsum slurry preparation by about 10 lb/MSF (1,000 square feet).

Coarse starch, that is larger particle size starch, can be used in the gypsum-containing slurry, since it is less dusty and easier to produce and to handle. In addition, larger particle sizes require less water in the slurry. However, due to the larger particle size it is difficult to fully disperse coarse starch in the gypsum slurry using a standard dry basis process equipment, such as during very short-term mixing with water and stucco through a board mixer where contact time is typically less than one second. If a way could be found to effectively disperse larger particle size pregelatinized starch in the gypsum slurry, water usage could be reduced and cost savings realized. Additionally, if the use of a larger particle size pregelatinized starch also increased board strength, this would serve as another useful contribution to the art.

Furthermore, if a way could be found to effectively prepare a suitable pregelatinized starch dispersion before introduction to the board mixer on a standard production line, this would represent a useful contribution to the art.

BRIEF SUMMARY OF THE INVENTION

In one embodiment, the present invention comprises a wet starch system for making a gypsum wallboard having a loss-in-weight starch feeder for storage of dry starch, a venturi mixer, a vacuum pick-up unit for supplying the dry starch from the feeder at an adjustable rate to the venturi mixer, a first water pump for supplying water at an adjustable rate to the venturi mixer to form a starch pre-dispersion of from about 2% to about 10% by weight starch; and a second water pump for supplying gauging water to the starch pre-dispersion.

Further process controls are optionally added to the system, including a slurry output controller for delivering the starch pre-dispersion in gauging water at an adjustable rate and a measurable concentration to a board mixer on a gypsum board production line, and control means for calculating a difference between an actual slurry output concentration and a target slurry output concentration and signalling the starch feeder to adjust the starch supply rate and/or the first water pump to adjust the water supply rate based on the difference.

In one embodiment of the invention, the wet starch system can further include a holding tank for the about 2% to about 10% starch pre-dispersion for de-aerating said pre-dispersion and for further hydrolyzing the large starch particles.

In another embodiment, the wet starch system can further include a board mixer for receiving the starch pre-dispersion in gauging water and stucco. Furthermore, the flow rate of the starch pre-dispersion in gauging water to the board mixer may be adjustable, or alternatively can be held constant.

Further provided is a method for preparing a starch pre-dispersion in gauging water for the production of gypsum wallboard, including feeding a dry starch at an adjustable rate to a venturi mixer, wetting the starch with water in the venturi mixer to form a starch slurry at a concentration of from about 2% to about 10% based on the weight of the starch, delivering the starch slurry to the gauging water to form a starch pre-dispersion in the gauging water, calculating a starch pre-dispersion delivery rate by means of a slurry output controller, and delivering the starch pre-dispersion in the gauging water to a board mixer on a production line. Optionally, the starch slurry can be recycled (e.g. into a holding tank) before delivering the slurry to the gauging water to form a starch pre-dispersion in the gauging water.

For production of gypsum wallboard, following pre-dispersion of the starch in water, the pregelatinized starch dispersion is added to the stucco-containing slurry. The resulting starch-containing stucco-containing slurry is deposited on a first paper cover sheet, and a second paper cover sheet is placed over the deposited slurry to form a gypsum wallboard. The gypsum wallboard is cut to the desired length after the gypsum-containing slurry has hardened sufficiently for cutting, and the resulting gypsum wallboard is dried in a kiln. Other conventional ingredients will also be used in the slurry including, as appropriate, dispersants (such as naphthalenesulfonates), sag resistance and strength additives (such as trimetaphosphates), accelerators, binders, paper fiber, glass fiber, and other known ingredients. A soap foam also can be added to reduce the density of the final gypsum wallboard product.

In accordance with the present invention, the amount of starch used will be at least about 10% less than a system in which the starch is not pre-dispersed in water prior to the board mixer.

DETAILED DESCRIPTION OF THE INVENTION

Figure 1:
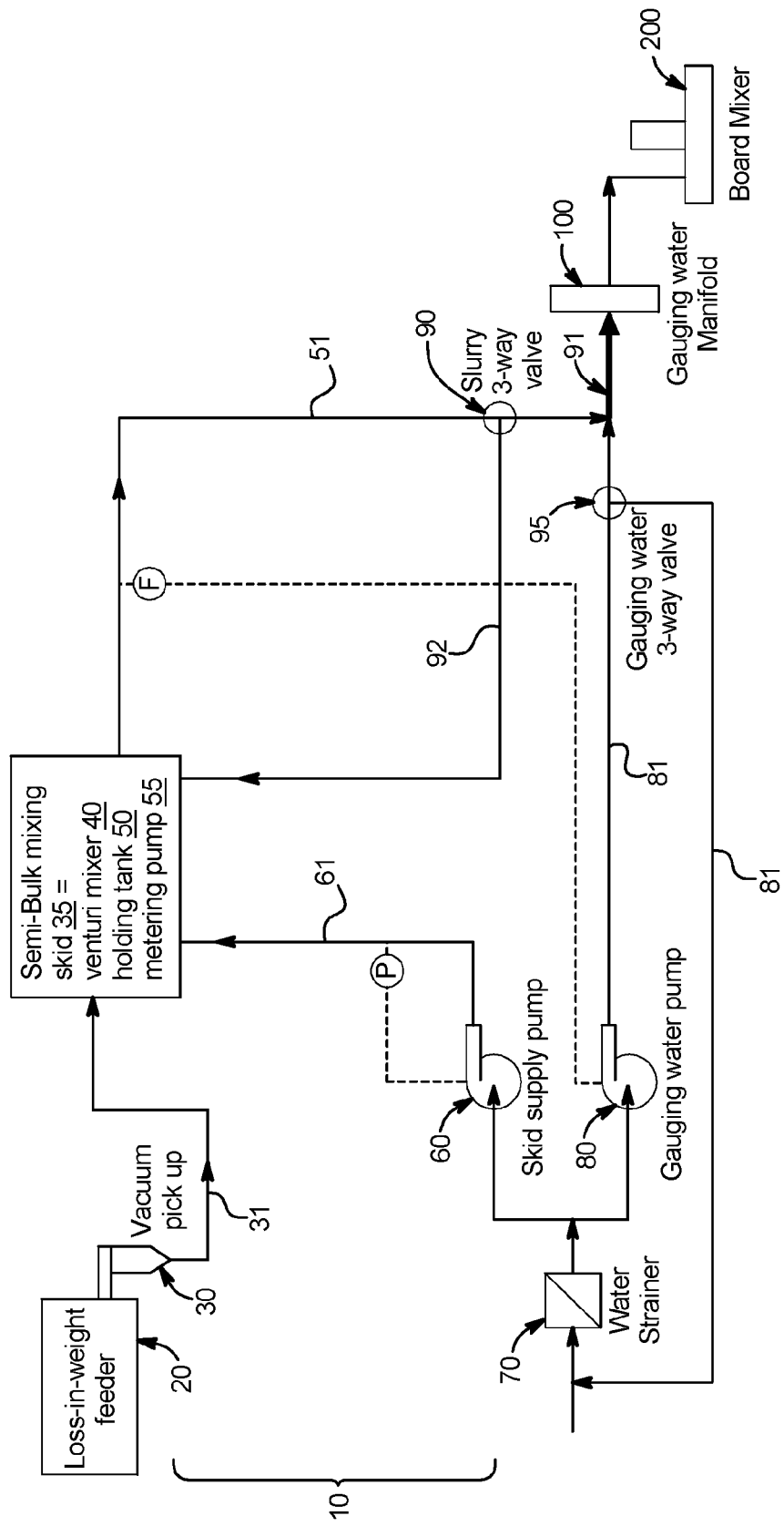
FIG. 1 depicts an embodiment of a wet starch system in accordance with the present invention.

In one aspect, the present invention comprises an unexpectedly efficient wet starch preparation system comprising a loss-in-weight starch feeder for storage of dry starch, a venturi mixer, a vacuum pick-up unit for supplying the dry starch from the feeder at an adjustable rate to the venturi mixer, a first water pump for supplying water at an adjustable rate to the venturi mixer to form a starch pre-dispersion of from about 2% to about 10% by weight starch; and a second water pump for supplying gauging water to the starch pre-dispersion.

In a preferred embodiment, the wet starch system is used to completely disperse a pre-gelatinized corn flour into the process water to be used to make gypsum wallboard before it is introduced into the board mixer. Furthermore, the present system can be used to produce lightweight ½-inch gypsum wallboards having a dry weight of about 1100 lb/MSF to about 1300 lb/MSF.

For example, the wetted starch can be mixed with the gauging water prior to the water manifold. This mixing provides additional efficiencies by uniformly distributing the wetted starch throughout the gauging water. This, in turn, assures good distribution of the starch in the set gypsum core.

It has been unexpectedly found that the present invention is effective in reducing starch and lump build-up in the mixer during gypsum board production.

It has further been unexpectedly found that the present invention is effective in lowering pregelatinized starch usage in production of gypsum wallboard by about 10-20% (i.e., from 26 lbs/MSF to 20-23 lbs/MSF) without any negative impact.

The system may use a starch feeder, such as a loss-in-weight feeder, a vacuum pick-up unit, and a skid mounted wetting system. The skid is a key aspect of the system. It contains the controls and equipment needed to wet the starch that is being weighed by the feeder. It also has a metering pump to pump the starch slurry to the board mixer. The plant can provide water at 70 psi to the mixing skid. The skid provides wetted starch slurry to the board mixer at a rate required by the formulation.

The wetting system is a venturi mixing system, such as a Vacucam Ejector Mixer, Vacucam EJM 2000, available from SemiBulk Systems Inc., St. Louis, Mo., that uses the vacuum created in the venturi to completely wet the dry powder that is being measured by the loss-in-weight feeder. The water pressure is maintained in the venturi using a gear pump.

A useful loss-in-weight feeder is an Acrison 270 "In-Line" Weigh Feeder, available from Acrison Inc., Moonachie, N.J. A useful vacuum pick-up unit is available from SemiBulk Systems Inc., St. Louis, Mo.

In one embodiment, the wetted starch is ejected into a holding tank that deaerates the starch slurry and provides time for the starch to start swelling and hydrolyzing in the water. From this tank the starch slurry is metered back into the gauging water line to be dispersed into the gauging water before the board mixer on the production line.

This system will provide at least a 10% reduction in pregelatinized starch usage in gypsum board production methods.

There are two major efficiencies provided by this system. The starch is fully dispersed in the gauging water so that it will be more thoroughly dispersed in the set gypsum core of the final product. Also the starch is in a more reactive state when it enters the mixer because it is fully wetted and hydrolyzed, so the starch dispersion can impart greater beneficial effects during the initial gypsum hydration process in the board mixer.

In an embodiment of the system 10 illustrated in FIG. 1, a loss-in-weight feeder 20 is shown connected to a vacuum pick-up unit 30. The system includes a semi-bulk mixing skid 35 comprising a venturi mixing system 40, that uses the vacuum created in the venturi to completely wet the dry starch, a holding tank 50, and a metering pump 55.

Temperature controlled water is supplied to a skid supply pump 60 on the accepts side of a gauging water strainer 70. This same water is supplied to a gauging water pump 80.

The mixing skid controls will call for water whenever the system needs it. Under normal operation this will be when the board line (via board mixer 200) is calling for starch. The board line 200 will call for starch and hence the skid 35 will call for starch and water to make up the concentration that is required in the desired gypsum board formulation. For example, if a 2% pregelatinized starch solution is required, two pounds of starch may be added to 98 pounds of water.

During start-ups or changeovers the flow may vary, but the starch concentration remains generally uniform. In order to keep the supply in the holding tank 50 constant, controls are in place to keep the liquid level in the holding tank 50 constant. During the upset at a start up or changeover when more starch slurry is needed to fill up the holding tank, the skid controls will call for more starch and more water will be added to keep the concentration constant. If the holding tank is over the set level, less starch (and therefore less water) will be called for keeping the concentration of the starch slurry constant.

This constant starch concentration allows metering pump 55 to act like a feeder. A change in the formulation results in a speed change in the metering pump. A change in starch concentration is required if the feed rate is significantly changed. There is an operator controlled concentration set point for this purpose.

The flow rate of the starch and water slurry coming out of the skid 35 determines the flow rate of gauging water pump 80. Because the starch slurry is added back to the gauging water, a biasing program is used to keep water flow to the mixer 40 constant. As starch levels are increased, the gauging water pump slows, decreasing the flow.

There is a three-way valve 90 located so the starch slurry can be recycled in the loop (92) until needed. When the valve 90 is changed, the starch slurry (51) is added to a gauging water stream 81 after a gauging water three-way valve 95 before a manifold 100 to form a starch slurry pre-dispersion in gauging water (91). When the slurry three way valve 90 is turned to the board mixer 200, the biasing program reduces the gauging water flow so that the water flow to the board mixer 200 is constant.

Figure 2:
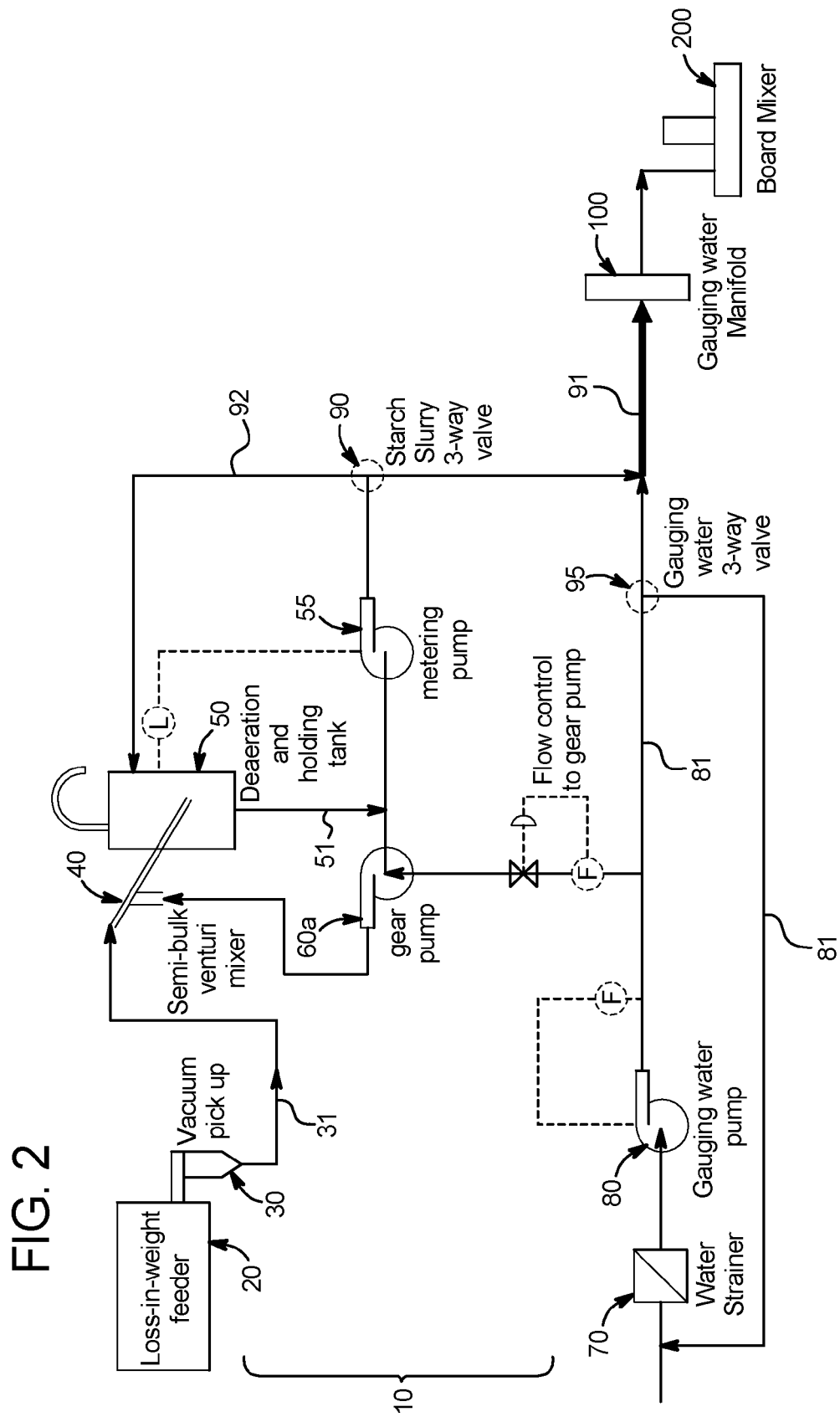
FIG. 2 depicts an alternative embodiment of a wet starch system in accordance with the present invention.

In an alternative embodiment of the system illustrated in FIG. 2, a supply pump 60 is replaced by a gear pump 60a, and the flow control for the starch slurry is removed.

In this embodiment, the metering system may be a loss-in-weight feeder 20. The pump 60a is run at a constant speed determined by the maximum amount of starch that would needed to be wetted at any given time. The flow from the gauging water line 81 to the pump 60a is constant after start up.

The speed of the metering pump 55 is controlled by the level of a holding tank 50. After reaching steady state this would be constant. It could also be pre-set, because it would be known what the flow from the gauging water line 81 is going to be. A level control will adjust for wear and viscosity changes.

It is preferred that soap foam be introduced to control the air (bubble) void sizes and distribution in the set gypsum core, and to control the density of the set gypsum core. Soap foam is added in an amount effective to produce the desired densities, and in a controlled manner. A preferred range of soap is from about 0.2 lb/MSF to about 0.7 lb/MSF; a more preferred level of soap is about 0.45 lb/MSF to about 0.5 lb/MSF. In order to control the process, an operator must monitor the head of the board forming line, and keep the envelope filled. If the envelope is not kept filled, wallboards with hollow edges result, since the gypsum slurry cannot fill the necessary volume. The envelope volume is kept filled by increasing the soap usage to prevent rupture of air bubbles during manufacturing of the board (for better retaining the air bubbles), or by increasing the air foam rate. Thus, generally, the envelope volume is controlled and adjusted either by increasing or decreasing the soap usage, or by increasing or decreasing the air foam rate. The art of controlling the head includes adjustments to the "dynamic slurry" on the table by adding soap foam to increase the total slurry volume, or by decreasing soap foam usage to decrease the total slurry volume.

Starches, including pregelatinized starch in particular, must be used in gypsum-containing slurries prepared in accordance with the present invention. A preferred pregelatinized starch is pregelatinized corn starch, for example pregelatinized corn flour available from Bunge Milling, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lb/ft$^3$. Pregelatinized corn starch should be used in an amount of at least about 0.5% by weight up to about 10% by weight, based on the weight of dry stucco used in the gypsum-containing slurry. In a more preferred embodiment, pregelatinized starch is present in an amount from about 0.5% by weight to about 4% by weight, based on the weight of dry stucco used in the gypsum-containing slurry.

Other useful starches include, but are not limited to, pregelatinized rice starch and pregelatinized wheat starch.

The water/stucco (w/s) ratio, or "WSR," of the slurry is an important parameter, since excess water must eventually be driven off by heating, which is wasteful and expensive due to the high cost of the fuels used in the heating process. It is advantageous for the amount of process water, and consequently WSR, to be kept low. In the present invention, WSR can range from about 0.3 to about 1.5, depending on starch usage level and stucco characteristics (particle size/shape). In a preferred embodiment, WSR can range from about 0.3 to about 1.2. In a more preferred embodiment, WSR can range from about 0.7 to about 0.9, which constitutes a substantially lower water demand compared to many known processes.

Naphthalenesulfonate dispersants can optionally be used in gypsum-containing slurries prepared in accordance with the present invention including polynaphthalenesulfonic acid and its salts (polynaphthalenesulfonates) and derivatives, which are condensation products of naphthalenesulfonic acids and formaldehyde. Particularly desirable polynaphthalenesulfonates include sodium and calcium naphthalenesulfonate. The average molecular weight of the naphthalenesulfonates can range from about 3,000 to 27,000, although it is preferred that the molecular weight be about 8,000 to 22,000, and more preferred that the molecular weight be about 12,000 to 17,000. As a commercial product, a higher molecular weight dispersant has higher viscosity, and lower solids content, than a lower molecular weight dispersant. Useful naphthalenesulfonates include DILOFLO, available from GEO Specialty Chemicals, Cleveland, Ohio; DAXAD, available from Hampshire Chemical Corp., Lexington, Mass.; and LOMAR D, available from GEO Specialty Chemicals, Lafayette, Ind. The naphthalenesulfonates are preferably used as aqueous solutions in the range 35-55% by weight solids content, for example. It is most preferred to use the naphthalenesulfonates in the form of an aqueous solution, for example, in the range of about 40-45% by weight solids content. Alternatively, where appropriate, the naphthalenesulfonates can be used in dry solid or powder form, such as LOMAR D, for example.

The polynaphthalenesulfonates useful in the present invention have the general structure (I):

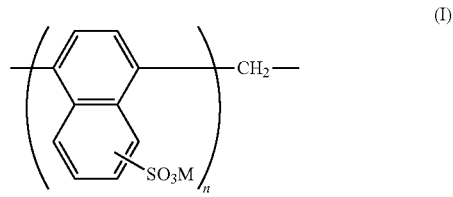

wherein n is >2, and wherein M is sodium, potassium, calcium, and the like.

The naphthalenesulfonate dispersant, preferably as an about 45% by weight solution in water, may be used in a range of from about 0.5% to about 3.0% by weight based on the weight of dry stucco used in the gypsum composite formulation. A more preferred range of naphthalenesulfonate dispersant is from about 0.5% to about 2.0% by weight based on the weight of dry stucco, and a most preferred range from about 0.7% to about 2.0% by weight based on the weight of dry stucco. In contrast, known gypsum wallboard contains this dispersant at levels of about 0.4% by weight, or less, based on the weight of dry stucco.

Stated in an another way, the naphthalenesulfonate dispersant, on a dry weight basis, may be used in a range from about 0.1% to about 1.5% by weight based of the weight of dry stucco used in the gypsum composite formulation. A more preferred range of naphthalenesulfonate dispersant, on a dry solids basis, is from about 0.25% to about 0.7% by weight based on the weight of dry stucco, and a most preferred range (on a dry solids basis) from about 0.3% to about 0.7% by weight based on the weight of dry stucco.

Strength additives, including metaphosphates and polyphosphates, can optionally be used in gypsum-containing slurries prepared in accordance with the present invention. Any suitable water-soluble metaphosphate or polyphosphate can be used in accordance with the present invention. It is preferred that a trimetaphosphate salt be used, including double salts, that is trimetaphosphate salts having two cations. Particularly useful trimetaphosphate salts include sodium trimetaphosphate, potassium trimetaphosphate, calcium trimetaphosphate, sodium calcium trimetaphosphate, lithium trimetaphosphate, ammonium trimetaphosphate, and the like, or combinations thereof. A preferred trimetaphosphate salt is sodium trimetaphosphate. It is preferred to use the trimetaphosphate salt as an aqueous solution, for example, in the range of about 10-15% by weight solids content. Other cyclic or acyclic polyphosphates can also be used, as described in U.S. Pat. No. 6,409,825 to Yu et al., herein incorporated by reference.

Sodium trimetaphosphate is a known strength additive in gypsum-containing compositions, although it is generally used in a range of from about 0.05% to about 0.08% by weight based on the weight of dry stucco used in the gypsum slurry. In embodiments of the present invention, sodium trimetaphosphate (or other water-soluble metaphosphate or polyphosphate) can be present in the range of from about 0.12% to about 0.4% by weight based on the weight of dry stucco used in the gypsum composite formulation. A preferred range of sodium trimetaphosphate (or other water-soluble metaphosphate or polyphosphate) is from about 0.12% to about 0.3% by weight based on the weight of dry stucco used in the gypsum composite formulation.

Paper fiber may be used in gypsum-containing slurries prepared in accordance with the present invention. A useful form of paper fiber is bleached or unbleached virgin paper fibers. Other cellulosic fibrous materials can be used, alone or in combination with paper fiber.

Accelerators can be used in the gypsum-containing compositions of the present invention, for example, wet gypsum accelerator (WGA), as described in U.S. Pat. No. 6,409,825 to Yu et al., herein incorporated by reference. One desirable heat resistant accelerator (HRA) can be made from the dry grinding of landplaster (calcium sulfate dihydrate). Small amounts of additives (normally about 5% by weight) such as sugar, dextrose, boric acid, and starch can be used to make this HRA. Sugar or dextrose are currently preferred. Another useful accelerator is "climate stabilized accelerator" or "climate stable accelerator," (CSA) as described in U.S. Pat. No. 3,573,947, herein incorporated by reference.

Other gypsum slurry additives can include binders, waterproofing agents, glass fibers, clay, biocide, and other known constituents.

There are two forms of stucco, alpha and beta. These two types of stucco are produced by different means of calcination. In the present inventions either the beta or the alpha form of stucco may be used.

One useful gypsum-containing slurry formulation used in making gypsum wallboard according to the present invention includes from about 20 to about 23 lb/MSF pregelatinized starch, about 5 lb/MSF dispersant, about 26 lb/MSF sodium trimetaphosphate solution (at ~11% STMP concentration), and up to about 2 lb/MSF glass fiber.

Gypsum wallboard made according to the embodiments of the present invention includes cover sheets or surface sheets, between which a set gypsum core is formed from a gypsum-containing slurry. In accordance with the invention, the gypsum-containing slurries will include a starch. The set gypsum-containing core material is sandwiched between two substantially parallel cover sheets, for example paper cover sheets. Various types of paper cover sheets are known in the art and all such types of paper cover sheets may be used in the present invention.

Cover sheets may be made of paper as in conventional gypsum wallboard, although other useful cover sheet materials known in the art (e.g. fibrous glass mats) may be used. Paper cover sheets provide strength characteristics in the gypsum wallboard. Useful cover sheet paper includes Manila 7-ply and News-Line 5-ply, available from United States Gypsum Corporation, Chicago, Ill.; Grey-Back 3-ply and Manila Ivory 3-ply, available from Caraustar, Newport, Ind.; Manila heavy paper and MH Manila HT (high tensile) paper, available from United States Gypsum Corporation, Chicago, Ill. The paper cover sheets comprise top cover sheets, or face paper, and bottom cover sheets, or back paper.

Fibrous mats may also be used as one or both of the cover sheets. One useful fibrous mat is a glass fiber mat in which filaments of glass fiber are bonded together by an adhesive. Preferably the fibrous mats will be nonwoven glass fiber mats in which filaments of glass fiber are bonded together by an adhesive. Most preferably, the nonwoven glass fiber mats will have a heavy resin coating. For example, Duraglass nonwoven glass fiber mats, available from Johns-Manville, having a weight of about 1.2-2.0 lb/100 ft$^2$, with about 40-50% of the mat weight coming from the resin coating, could be used. Other useful fibrous mats include, but are not limited to, woven glass mats and non-cellulosic fabrics.

It is noted here that in manufacturing of conventional gypsum wallboard, the top or face paper is laid down and moves along the production line first, and so constitutes what is known in the art as the "bottom" of the process, despite contacting and forming the top or face of the wallboard product. Conversely, the bottom or back paper is applied last in the manufacturing process in what is known as the "top" of the process. These same conventions will apply in the formation and preparation of the gypsum boards of the present invention.

Air voids produced by soap foam can reduce the bonding strength between a foamed low density set gypsum core and the cover sheets. Since greater than half of the composite gypsum boards by volume may consist of air voids due to foam, the foam can interfere with the bond between the foamed low density set gypsum core and the paper cover sheets. Optionally, this may be addressed by providing a non-foamed (or reduced-foamed) bonding high density layer on the gypsum core-contacting surfaces of both the top cover sheet and the bottom cover sheet prior to applying the cover sheets to the core. This non-foamed, or alternatively, reduced-foamed, bonding high density layer formulation typically will be the same as that of the gypsum slurry core formulation, except that either no foam will be added, or a substantially reduced amount of foam will be added. Optionally, in order to form this bonding layer, foam can be mechanically removed from the core formulation, or a different foam-free formulation can be applied at the foamed low density set gypsum core/face paper interface. In one preferred embodiment of gypsum boards made according to the principles of the present invention, additional bonding layers (top) may be omitted altogether due to increased paper-to-core and gypsum crystal bonding which can in part be attributed to more efficient and thorough distribution of starch in the set gypsum core as provided by the wet starch pre-dispersion system as described above.

The following examples further illustrate the invention but, of course, should not be construed as in any way limiting its scope.

EXAMPLE 1

Sample Gypsum Slurry Formulations Containing Pre-Dispersed Aqueous Starch

Exemplary gypsum-containing slurry formulations are shown in Table 1 below. Values in Table 1 are expressed as dry weight in pounds (lb/MSF), except as marked.

TABLE 1

| Component | Lower Starch Formulation | Higher Starch Formulation |
| --- | --- | --- |
| Stucco (lb/MSF) | 930 | 920 |
| Pregelatinized corn starch | 23 | 26 |
| sodium trimetaphosphate | 2.7 | 2.7 |
| Dispersant (naphthalenesulfonate)[1] | 5.0 | 5.0 |
| Heat resistant accelerator (HRA) | 9.2 | 9.2 |
| Glass fiber | 1.0 | 0.7 |
| Soap blend[2] | 0.45 | 0.45 |
| Water/Stucco ratio (w/s) | 0.89 | 0.89 |

[1] 45% aqueous solution
[2] Blend of HYONIC 25 AS and PFM 33 soaps (available from GEO Specialty Chemicals, Lafayette, Indiana). Note that during dynamic manufacturing process, the soap ratio can range from 70/30 upwards to a desired target range, e.g. from 70/30 to 80/20 to 85/15 or up to 95/5.

EXAMPLE 2

Preparation of Gypsum Wallboard Using Pre-Dispersed Starch

Sample gypsum wallboards were prepared using gypsum slurry Lower Starch and Higher Starch Formualtions of Example 1, in accordance with U.S. Pat. No. 6,342,284 to Yu et al. and U.S. Pat. No. 6,632,550 to Yu et al., herein incorporated by reference, except that the pregelatinized corn starch was pre-dispersed in process water at about 80° F. and added to the process (gauging) water in accordance with the present invention and injected into the board mixer. This includes the separate generation of foam and introduction of the foam into the slurry of the other ingredients as described in Example 5 of these patents.

EXAMPLE 3

Test Results for ½ Inch Gypsum Wallboard Prepared with Pre-Dispersed (Wet) Pregelatinized Corn Starch Test gypsum wallboards were prepared according to Example 2.

TABLE 2

| Trial formulation test results | Lower Starch Formulation Board | Higher Starch Formulation Board |
| --- | --- | --- |
| Dry board weight (lb/MSF) | 1242 | 1197 |
| Nail pull resistance (lb)[†] | 88.5 | 84.2 |
| 3h Humidified bond[1] load, average (lb) | 20.6-21.3 | 21.7-26.2 |
| 3h Humidified bond[1,2] failure (%) | 0 | 0 |
| Edge hardness (lb) | 40-46 | 44-49 |
| Core hardness (lb) | 22 | 19-20 |
| Flexural strength, average (MD) (lb) | 40-48 | 48-54 |
| Flexural strength, average (CMD) (lb) | 139-142 | 139-143 |

[1] 90° F./90% Relative Humidity
[2] It is well understood that under these test conditions, percentage failure rates <50% are acceptable.
[†] ASTM standard: 77 lb
MD: machine direction
CMD: cross machine direction Nail pull resistance, edge and core hardness, and flexural strength tests were performed according to ASTM C-1396.

Additionally, it is noted that typical gypsum wallboard is approximately ½ inch thick and has a weight of between about 1600 to 1800 lb/MSF.

As shown in Table 2, both wallboards exceed ASTM standards for strength and nail pull resistance, while substantially reducing board weight. Both wallboards also exhibit excellent core hardness and humidified bond (paper-to-core) properties. It is notable and unexpected that the lower starch level board meets all strength standards and other board criteria while reducing the starch levels by about 12%, which will result in substantial material and cost savings. It is expected that even if starch levels were reduced by up to about 25% in the formulations provided by the present system, compared to the higher starch level formulation, that the observed strength, core hardness, and humidified bond (paper-to-core) properties would be maintained.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for preparing a starch pre-dispersion in a gauging water line for the production of gypsum wallboard, comprising:
    (a) feeding a dry starch at an adjustable rate to a venturi mixer;
    (b) wetting the starch with water in the venturi mixer to form a starch slurry at a concentration of from about 2% to about 10% based on the weight of the starch;
    (c) delivering the starch slurry from the venturi mixer to the gauging water line outside the venturi mixer to form a starch pre-dispersion in the gauging water line; and
    (d) delivering the starch pre-dispersion in the gauging water line to a board mixer on a production line.

2. The method of claim 1, further comprising:
    (e) calculating a starch pre-dispersion delivery rate by means of a slurry output controller.

3. The method of claim 1, further comprising recycling the starch slurry before delivering the slurry to the gauging water line to form a starch pre-dispersion in the gauging water line.

4. The method of claim 1, wherein the starch feeding rate is constant.

5. The method of claim 1, wherein the starch slurry is delivered at a constant rate.

6. The method of claim 1, wherein the starch is pregelatinized corn flour.

* * * * *